United States Patent
Patrickson et al.

(10) Patent No.: US 6,412,817 B2
(45) Date of Patent: Jul. 2, 2002

(54) PRETENSIONER

(75) Inventors: James Patrickson, Wigton; Andrew Downie, Carlisle; Stuart Bland, Bourton on the Water; Bryan Thirlwell, Haltwhistle, all of (GB)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

(21) Appl. No.: 09/796,948

(22) Filed: Mar. 2, 2001

Related U.S. Application Data

(62) Division of application No. 09/347,500, filed on Jul. 2, 1999, now Pat. No. 6,234,524.

(30) Foreign Application Priority Data

Mar. 5, 1999 (GB) .............................................. 9905188

(51) Int. Cl.⁷ ................................................. F42B 3/18
(52) U.S. Cl. ................................... 280/741; 102/202.1
(58) Field of Search ................................ 280/736, 741; 102/202.1, 202.5, 202.9, 202.14, 530, 531

(56) References Cited

U.S. PATENT DOCUMENTS

| | | | |
|---|---|---|---|
| 3,971,320 A | * | 7/1976 | Lee |
| 4,745,858 A | | 5/1988 | Harder ..................... 102/202.1 |
| 5,140,906 A | | 8/1992 | Little, II ................. 102/202.14 |
| 5,345,872 A | | 9/1994 | Takahashi et al. ........ 102/202.2 |
| 5,433,147 A | * | 7/1995 | Brede et al. ................. 280/741 |
| 5,454,320 A | * | 10/1995 | Hilden et al. ............. 102/202.9 |
| 5,487,559 A | * | 1/1996 | Headley ..................... 280/741 |
| 5,556,132 A | | 9/1996 | Sampson ..................... 280/741 |
| 5,558,366 A | | 9/1996 | Fogle, Jr. et al. ........... 280/736 |
| 5,621,183 A | * | 4/1997 | Bailey ..................... 102/202.9 |
| 5,623,115 A | | 4/1997 | Lauritzen et al. |
| 5,634,660 A | | 6/1997 | Fink et al. .................. 280/741 |
| 5,639,986 A | * | 6/1997 | Evans ........................ 280/741 |
| 5,662,353 A | | 9/1997 | Bergerson et al. .......... 280/741 |
| 5,672,841 A | | 9/1997 | Monk et al. ............. 102/202.1 |
| 5,821,446 A | * | 10/1998 | Chatley, Jr. ................. 280/741 |
| 5,932,832 A | | 8/1999 | Hansen et al. ........... 102/202.9 |
| 5,944,545 A | * | 8/1999 | Willhelm et al. |
| 6,007,096 A | * | 12/1999 | Shirk et al. ................. 280/736 |
| 6,009,809 A | * | 1/2000 | Whang ..................... 102/202.9 |
| 6,234,524 B1 | * | 5/2001 | Patrickson et al. ......... 280/741 |

FOREIGN PATENT DOCUMENTS

| | | |
|---|---|---|
| EP | 779492 | 6/1997 |
| EP | 827883 | 3/1998 |
| GB | 2281608 | 3/1995 |

* cited by examiner

Primary Examiner—Brian L. Johnson
Assistant Examiner—Christopher Bottorff
(74) Attorney, Agent, or Firm—Jarett Rieger

(57) ABSTRACT

A pretensioner for a vehicle occupant safety restraint has an outer casing that contains a gas generant. An igniter has igniter material disposed within an igniter housing. A pair of electrodes are connected to the igniter material. A grounding path connector link electrically connects the igniter housing to a grounding path. The connector link may be formed by springs connecting the outer case to the grounding electrode and an interference fit connecting the igniter housing to the outer case. The link forms a low resistance path to short circuit undesirable static charges in the unit that would otherwise tend to cause unintentional activation of the pretensioner.

2 Claims, 4 Drawing Sheets

PRETENSIONER

This application is a Divisional of application Ser. No. 09/347,500 filed Jul. 2, 1999, now U.S. Pat. No. 6,234,524.

FIELD OF THE INVENTION

The present invention relates to a pretensioner for a vehicle occupant safety restraint, particularly for a seat belt.

BACKGROUND OF THE INVENTION

Pretensioners are used to rapidly pull in slack in a safety restraint seat belt at the onset of a crash to more securely restrain the vehicle occupant against forward movement and potential injury by collision with structural features of the vehicle. In addition, the pretensioning operation pulls the occupant into, or at least towards, the correct seating position to maximize the effect of a second restraint such as an airbag.

A modern seat belt is known as a 3-point restraint because it is secured to the vehicle at three points arranged about the vehicle occupant to provide a diagonal torso section and a horizontal lap portion to hold the vehicle occupant in the seat. The belt is attached to the vehicle by a spring-loaded retractor tending to tighten in the belt, and by a buckle for quick release of the belt.

Pretensioners are typically sited at the retractor or at the buckle end of the restraining seat belt. They are designed to store energy which when released effects the pretensioning operation. This energy may be mechanical energy in the form of a stressed spring, but more modern pretensioners are pyrotechnically operated. Pyrotechnically operated pretensioners comprise a sealed tube containing a gas generant composition which reacts rapidly to generate gas which expands rapidly to provide the energy to effect the pretensioning operation. The gas generant composition is ignited electrically via pin terminals protruding from the pretensioning tube and connected to an intermediate igniter material.

DISCUSSION OF THE PRIOR ART

The general construction of a pretensioner and the manner in which it is fitted into a vehicle to control a safety restraint seat belt is well known to persons skilled in the art. One such example is shown and described in EP 827 883 A.

SUMMARY OF THE INVENTION

One problem with pyrotechnically operated pretensioners is that spurious electric charges can produce inadvertent activation of the pretensioner. For example static charge may build up within the sub-assembly of the pretensioner. When the unit passes over or through any static field a low voltage will flow across the sensitive igniter material. This low voltage will in time break down the protective coating on the igniter material and once exposed it will react with oxygen and ignite-thus causing the pretensioner to be activated.

In addition, inadvertent firing will occur with single discharges of static electricity, especially across the igniter material, which provides a short path between the firing pins and the igniter casing.

The present invention aims to provide an improved pretensioner, which can be used at either end of the seat belt.

According to one aspect of the present invention there is provided a pretensioner for a vehicle occupant safety restraint comprising: an outer casing; gas generant contained within said outer case; an igniter comprising igniter material within an igniter housing; a pair of electrodes connected to said igniter material; and a ground path connector link electrically connecting the igniter housing to a grounding path.

Preferably the connector link electrically connects the igniter housing to one of the electrodes. Advantageously the link is a very low, or even almost zero, resistance link and is connected to one of the pins only with a shorting connection between the two electrodes being provided.

Thus a low resistance link is provided for the charge to take through the unit so as to prevent the build up of charge and thus inhibit spurious activation of the pretensioner.

According to a first embodiment of the present invention the pretensioner is constructed so that the igniter housing is electrically connected to the outer case of the pretensioner, for example by making it an interference fit in the case, and one of the electrode pins (preferably the grounded one) forms an electrical connection to the outer case, for example it may comprise a bent section protruding through the igniter housing and fitting, interference wise, with the outer case. Thus a short circuit is provided between the igniter housing and the grounded electrode pin via the outer case to discharge spurious static currents.

This embodiment has the advantage of requiring few parts and no substantial modification of the igniter housing. Also there are only two points which need maintain electrical connection.

According to a second embodiment the link is provided by a resilient member, preferably a spring pressed over one of the pins. The igniter housing is again formed as an interference fit with the outer case and the spring providing the low resistance link from the case to the pin.

The resilience of the spring maintains the electrical connections and reduces the risk of the contact being broken. This embodiment also requires very little or no changes to the igniter housing design.

According to a third embodiment the igniter housing is made from non-conductive material and the igniter housing has a cap which is crimped with the outer case directly into a conductive sleeve, and one of the pins is modified so that a flat anti-rotation feature is extended outwards to contact with the conductive sleeve. This embodiment has the advantage that a relatively low number of electrical contacts are required and little modification to manufacturing tools is needed.

According to a fourth embodiment the igniter housing is molded or cast from conductive material and one of the pins is coated in an insulating material such as plastic. The igniter housing cap and the outer case are crimped directly onto a conductive sleeve thus creating a low resistance link between the conductive igniter housing and the pin. The second pin is insulated from the igniter housing. This has the advantage of reducing the number of electrical contacts, and requiring no additional components.

According to a fifth embodiment the igniter housing cap is designed as an interference fit with the outer case, so as to electrically connect the two components, and an electrical connection is formed between the outer case and one of the pins, for example by an extended leg jutting from the outer case to contact the pin. This embodiment requires no additional parts and no modification to existing manufacturing tools.

Of course, modifications and combinations of the features of each of the embodiments are envisaged and are intended to be within the scope of the invention.

BRIEF DESCRIPTION OF THE DRAWINGS

For a better understanding of the present invention and to show how the same may be carried into effect, reference will now be made to the accompanying drawings, in which.

DETAILED DESCRIPTION OF THE INVENTION

In the Figures like parts are denoted by like reference numbers.

Figure 1:
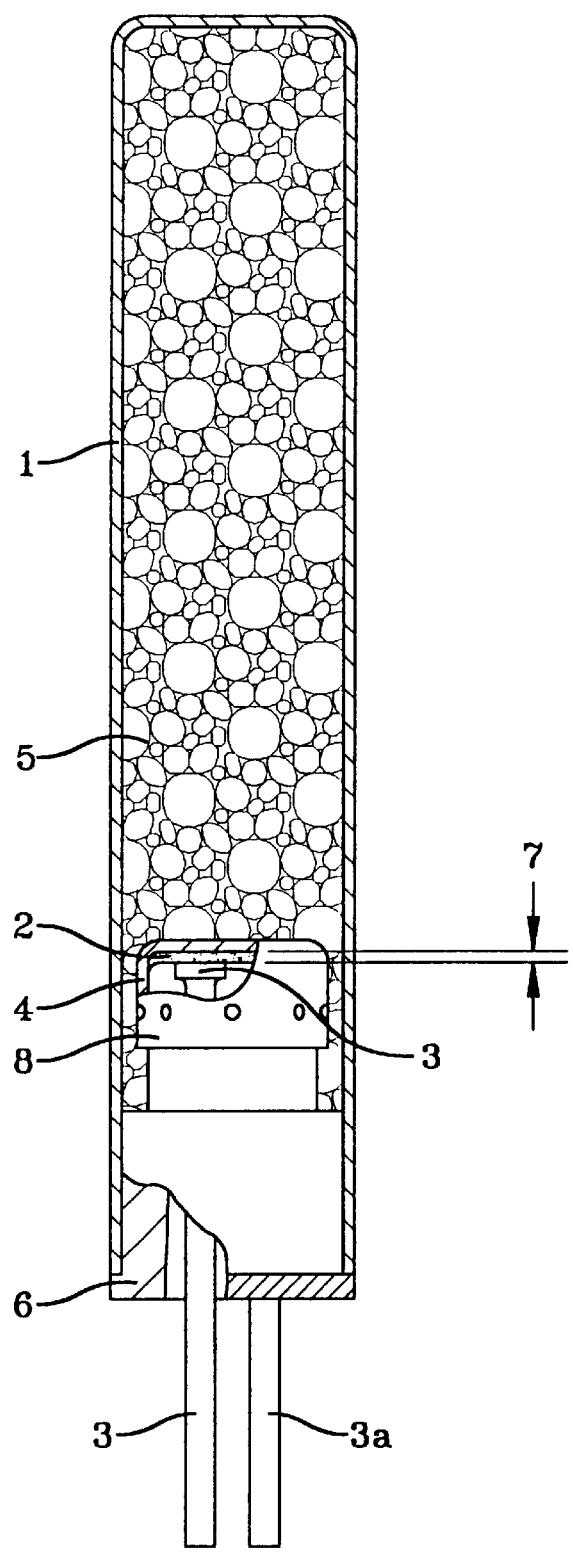
FIG. 1 is a cross-sectional view of part of a known prior art pretensioner.

Referring first to FIG. 1 there is shown is a cross-sectional view of part of a known prior art pretensioner. The pretensioner comprises an outer case 1 in the form of a cylindrical tube of metallic material. This is filled with a gas generant 5, numerous examples of which are known to those skilled in the art. Within the outer case 1 is situated a small quantity of sensitive igniter material 2 sandwiched behind an igniter header cap 4. The igniter material 2 has a thickness indicated by 7.

Two electrode pins 3, 3a pass through a seal 6 forming the igniter housing 8 at the end of the outer case 1. They are connected by means of a thin wire (not shown) welded to each pin and lying adjacent to or embedded in the igniter material 2. One of the pins 3 is connected to ground and thus provides a grounding path.

When an electric current is applied across the electrode pins 3, 3a, the thin wire heats up and ignites the igniter material 2. This activates the main gas generant material 5.

Spurious electric charges, such as those which result from electrostatic build up, can cause an undesirable discharge of current from the outer case 1 to the header cap 4 and thus through the sensitive igniter material 2 to the grounding pin 3. When such a current passes through the igniter material it often causes ignition leading to spurious activation of the pretensioner.

FIGS. 2 to 6 show several embodiments of the invention in which spurious discharges are reduced.

Figure 2:
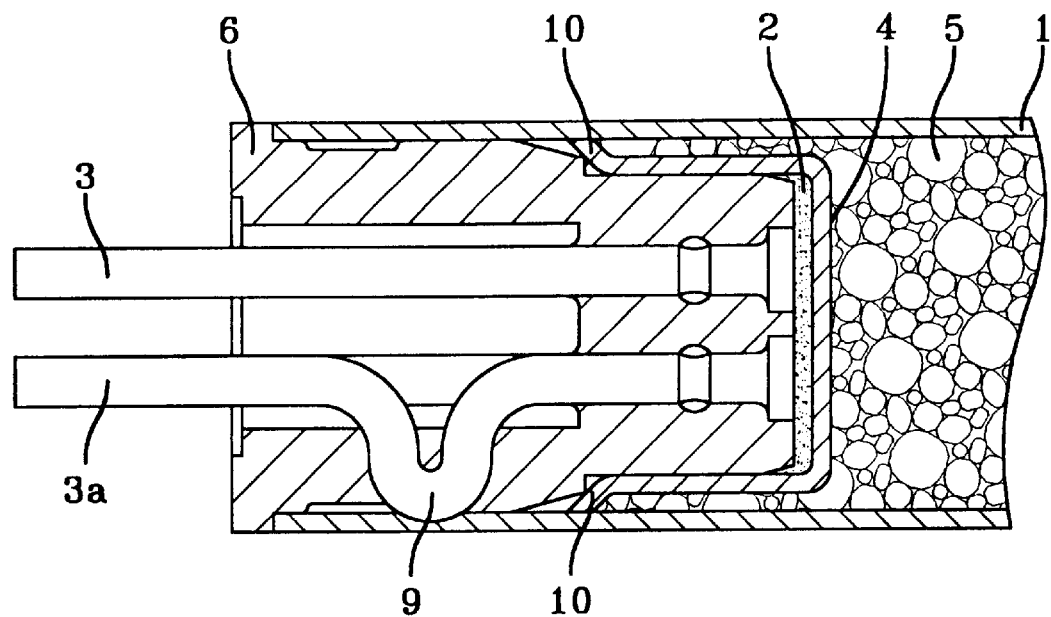
FIG. 2 is a cross-sectional view of part of a pretensioner according to one embodiment of the present invention.

A first embodiment of the invention is shown in FIG. 2. The electrode 3a has a U-bend 9 formed to connect with the inside wall of the outer case 1 and form an electrical connection therewith. In addition the header cap 4 is modified to provide an electrical connection with the inside wall of the outer case 1 by an outwardly bent portion in the form of projecting tangs 10. Thus an electrical connection is provided between the header cap 4 and the grounding pin 3, via the outer case 1, of relatively low resistance so that spurious charges are discharged to ground before they build up sufficiently to activate the sensitive igniter material 2.

Figure 3:
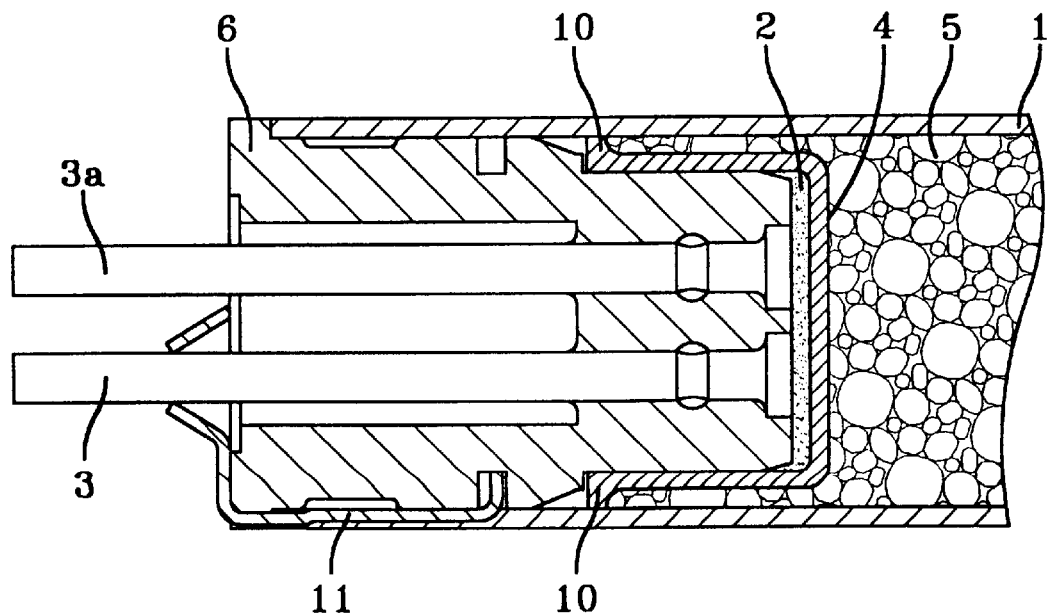
FIG. 3 is a cross-sectional view of part of a pretensioner according to a second embodiment of the present invention.

The second embodiment shown in FIG. 3 utilises a pressed metal clip 11 to provide a link from the generator case 1 to the grounding pin 3. As in the embodiment of FIG. 1 the header cap 4 is formed as an interference fit with the outer case by means of tangs 10 contacting the inside surface of the outer case. Again this provide a short circuit to ground for spurious charges. The tangs may be formed on assembly of the pretensioner by the case being inserted over the header cap.

Figure 4:
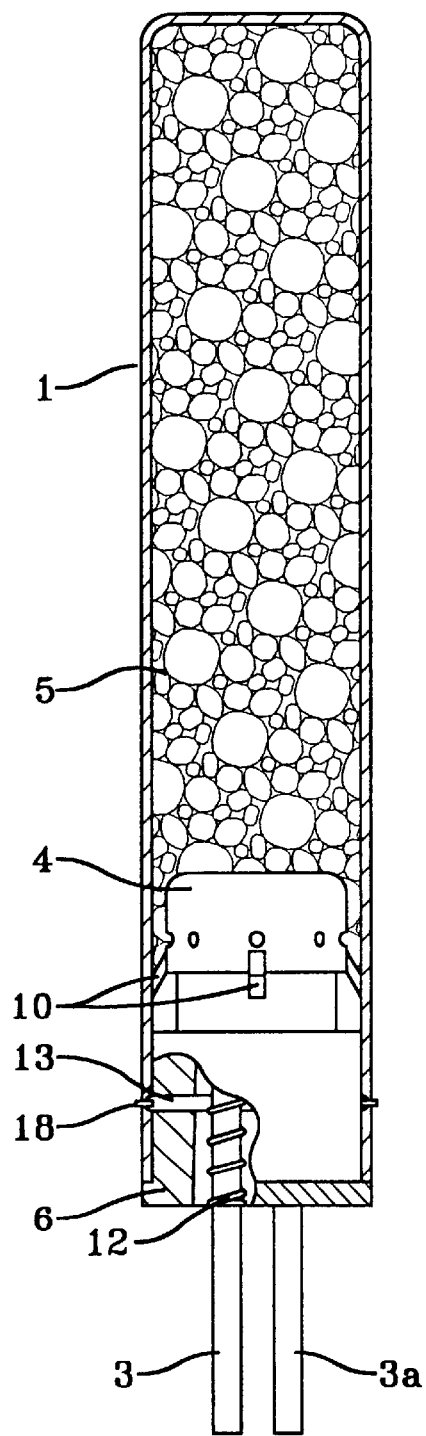
FIG. 4 is a cross-sectional view of part of a pretensioner according to a third embodiment of the present invention.

FIG. 4 is similar to FIG. 3 but shows the use of a stainless steel tension spring 12 wound around the grounding pin 3 with its free end connected to the generator outer case 1 to provide the required short circuit link between the case 1 and ground. This is in place of the pressed spring 11 shown in FIG. 3. The link between the header cap 4 and the case 1 is again provided by bent tags 10. An annular groove 13 of between 0.3 and 0.5 mm depth is formed in the case to clamp the case to the fuse seal 6 and retain the two to a pull off load of up to 250 N. A plurality of stakes 18, typically eight, equally spaced around the circumference of the groove serve to make the connection stronger.

Figure 5:
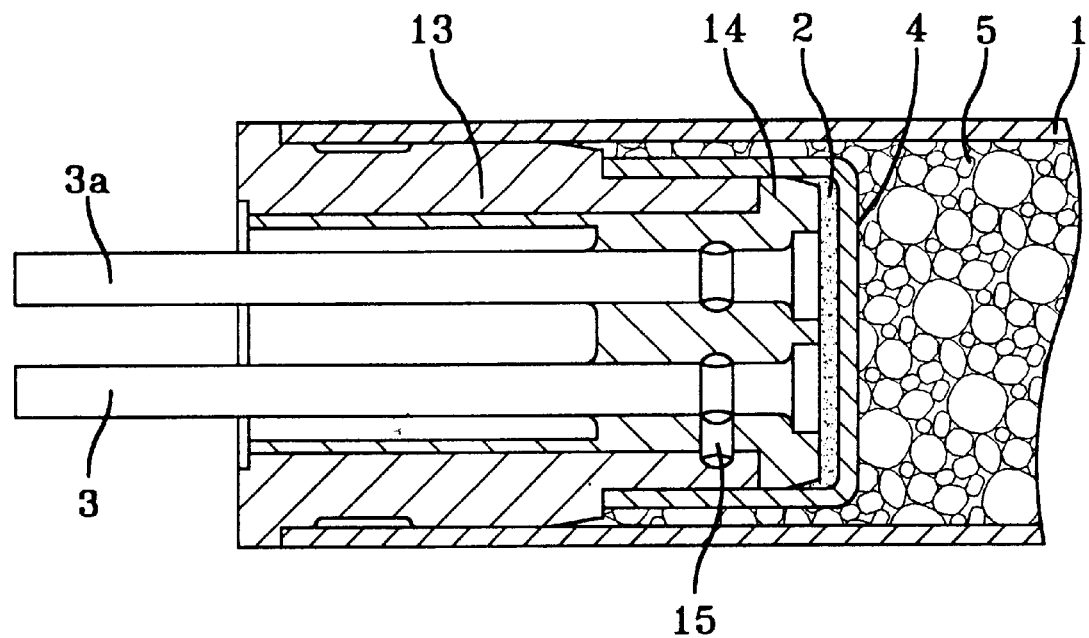
FIG. 5 is a cross-sectional view of part of a pretensioner according to a fourth embodiment of the present invention.

In FIG. 5 the igniter housing 8 comprises two parts: a conductive outer sleeve 13, formed for example from aluminium, and a non-conductive insert 14 which may be moulded of standard plastics material such as that known as PBT. The outer sleeve provides a direct electrical connection to the outer case 1. The outer sleeve is connected to the grounding pin 3 by a stainless steel pin 15. This stainless steel pin is formed by a relatively small change to the anti-rotation feature.

Figure 6:
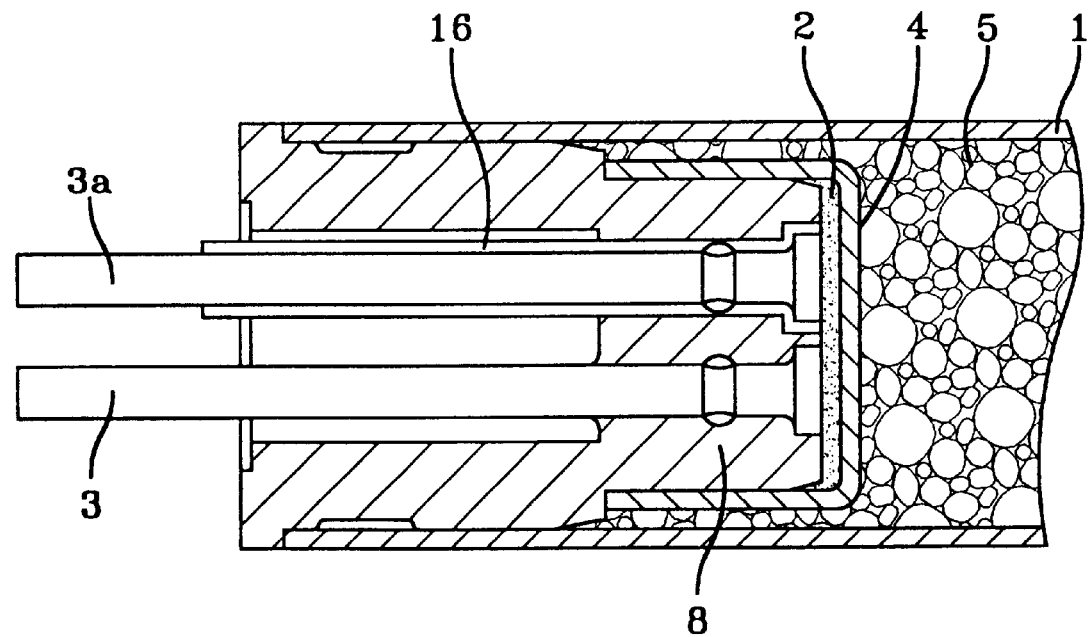
FIG. 6 is a cross-sectional view of part of a pretensioner according to a fifth embodiment of the present invention.

FIG. 6 illustrates an embodiment in which the grounding pin 3 is directly connected to both the outer case 1 and to the header cap 4 by using a conductive plastic material for the igniter housing 8. This will provide the low resistance short circuit path required from the header cap 4 to ground. However, in this embodiment it is necessary to insulate the other electrode pin 3a and this is done by dipping it into insulating plastics material 16 prior to moulding the housing 8 around the pins 3, 3a.

Figure 7:
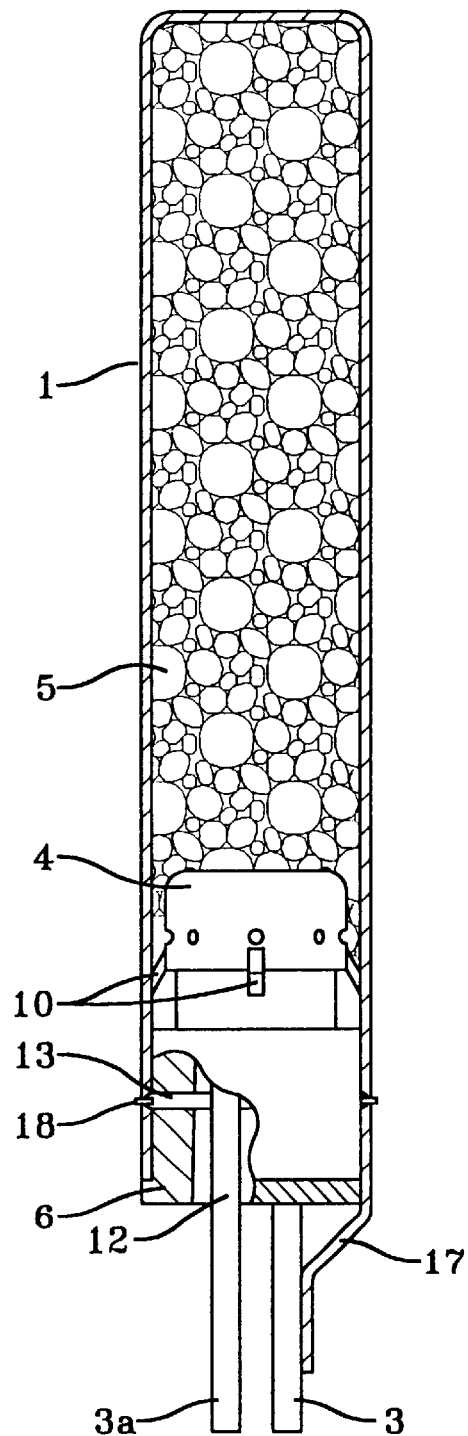
FIG. 7 is a cross-sectional view of part of a pretensioner according to a sixth embodiment of the present invention.

Another embodiment is shown in FIG. 7 where the outer case 1 is formed with an extending leg 17 which contacts the grounding pin 3 directly. The header cap 4 is formed as an interference fit with tangs 10 to provide the connection from the header cap to the case, as in the embodiments of FIGS. 2, 3 and 4. A circumferential groove 13 with spaced stakes is also provided to ensure a strong connection between the case 1 and the igniter housing 8 as in the embodiment of FIG. 4.

Many changes and modifications in the above described embodiments of the invention can, of course, be carried out without departing from the scope thereof. Accordingly, that scope is intended to be limited only by the scope of the appended claims.

What is claimed is:

1. A pretensioner for a vehicle occupant safety restraint, which removes static charges in order to avoid inadvertent actuation of the pretensioner comprising:
   an outer case;
   a header cap disposed within the outer case comprising a top portion and a side portion;
   a gas generant contained within said outer case, the gas generant is disposed between said outer case and said header cap;
   an igniter comprising an igniter housing comprising a conductive plastic material and igniter material for igniting a gas generant material, said igniter housing being disposed at least partially within the header cap and adjacent thereto, said igniter housing also being adjacent to said outer case, the igniter material being disposed inside the header cap and retained therein by the igniter housing; and first and second electrodes extending completely through the igniter housing and communicating with said igniter material, the first electrode is electrically connected by the conductive plastic material of the igniter housing to the outer case and said first electrode is electrically connected by the conductive plastic material of the igniter housing to the interior of the side portion of the header cap, said first electrode functioning as a ground path connector link connecting the header cap and the outer case to a grounding path, the second electrode is coated with an insulating material such that the second electrode is not in electrically conductive communication with the conductive plastic material igniter housing.

2. The pretensioner for a vehicle occupant safety restraint according to claim 1 wherein the ground path connector link is a very low resistance link relative to the resistance of the firing path of the igniter.

* * * * *